United States Patent [19]

Tanisake et al.

[11] Patent Number: 5,147,962
[45] Date of Patent: Sep. 15, 1992

[54] MELT-PROCESSABLE COPOLYESTERIMIDE COMPOSED OF BIS-TRIMELLITIMIDE UNITS

[75] Inventors: Hiroka Tanisake; Koji Yamamoto; Takeshi Koyama; Shunichi Shinohara; Kazunobu Maruo; Tsukasa Toki, all of Hiratsuka, Japan

[73] Assignee: Mitsubishi Gas Chemical Company, Inc., Tokyo, Japan

[21] Appl. No.: 578,004

[22] Filed: Sep. 4, 1990

[30] Foreign Application Priority Data

Sep. 4, 1989 [JP] Japan .................. 1-228684

[51] Int. Cl.⁵ ............................. C08G 73/16
[52] U.S. Cl. ..................... 528/170; 528/184; 528/185; 528/190; 528/191; 528/193; 528/194; 528/322
[58] Field of Search ............... 528/170, 184, 185, 190, 528/191, 193, 194, 322

[56] References Cited

U.S. PATENT DOCUMENTS 4,882,410 11/1989 Neugebauer et al. .............. 528/170

FOREIGN PATENT DOCUMENTS 0213362 3/1987 European Pat. Off. .

OTHER PUBLICATIONS

Abstract of U.S.P. 4,383,105, May 1983.

*Primary Examiner*—Harold D. Anderson
*Attorney, Agent, or Firm*—Wenderoth, Lind & Ponack

[57] ABSTRACT

A copolyesterimide composed of bis-trimellitimide units, 2,6-naphthalenedicarboxylic acid units, hydroquinone units and p-hydroxybenzic acid units. This copolyesterimide is melt-processable, and excels in heat resistance and mechanical properties.

8 Claims, No Drawings

MELT-PROCESSABLE COPOLYESTERIMIDE COMPOSED OF BIS-TRIMELLITIMIDE UNITS

DETAILED EXPLANATION OF THE INVENTION

This invention relates to melt-processable copolyesterimide. More specifically the invention relates to novel copolyesterimide which is melt-processable at temperatures not higher than 350° C., to provide molded articles of excellent heat resistance.

In the past, heat resistant polymers having various structures have been proposed.

Heat resistance of polymers bears a double meaning, one being their long-term heat resistance which is often referred to also as resistance to thermal aging. This indicates the extent a polymer can retain its initial appearance, mechanical and electrical performance, etc., after a prolonged exposure to high-temperature atmosphere. More specifically, this property is evaluated in terms of, for example, the thermal index obtained by long term thermalaging test, or the weight loss obtained by thermal gravimetric analysis because deterioration of properties of polymers is caused mainly by its decomposition due to oxidation or the like.

The other property talked of as heat resistance is that of a short term, which is evaluated by the extent a polymer can maintain such properties it initially had as strength, modulus or the like, when it is exposed to high temperatures for a short period. This latter heat stability is correlated with glass transition temperature and melting point of the polymer. More specifically, it is normally expressed using heat distortion temperature of the polymer as an index.

Because heat distortion temperature is expressed by the temperature at which the flexure of a test piece under a prescribed load reaches a prescribed value, it is believed to be correlated with retention of modulus under high temperatures.

From the standpoint of practical use, when the polymer article is exposed to elevated temperature the property of being free from exterior changes such as blistering is important. That is, when a polymer is used for parts of electrical devices, it is important for the polymer to excel in the "solder heat resistance", viz., being free from changes in appearance such as deformation, blistering, etc., when the molded article is dipped in molten solder bath.

The term, "heat resistance", used in the present specification should be understood to include both of above long-term and short-term heat resistance properties, unless otherwise specified.

Polyimides represented by pyromellitic polyimide are known as the polymers most excelling in resistance to thermal aging, but they have a defect of unsatisfactory processability.

As melt-processable thermoplastic polymers, polyamidimide and polyetherimide may be named, but their melt-processability is not necessarily sufficient. Thus polymers exhibiting both high heat resistance and good melt-processability is in keen demand.

Thermotropic liquid crystal polyester, on the other hand, has been drawing attention as a polymer having excellent melt-processability and mechanical properties.

The excellent melt-processability and mechanical properties of thermotropic liquid crystal polyester are attributed to its peculiar flow behavior. That is, because the polyester is formed of molecular chain which does not bend easily even in molten state but maintains its rod-like form, little molecular entanglement takes place and hence, the polyester is readily unidirectionally oriented under a small shear stress.

As a polymer unifying the excellent heat resistance of polyimide and the favorable melt-processability of thermotropic liquid crystal polyester, thermotropic liquid crystal polyesterimide having an imide bond-containing monomer as its structural component can be conceived.

Japanese Laid-Open (Kokai) Patent Publication No. 132933/1987 discloses a wholly aromatic liquid crystal polyesterimide which is composed of (a) 5–35 mol % of a recurring unit or units expressed by formula (1) and/or (2) below:

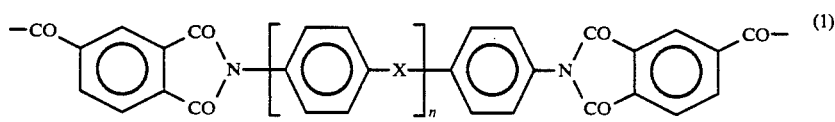

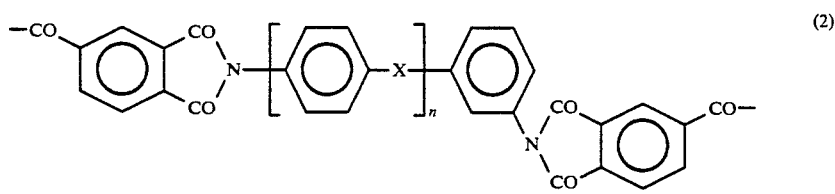

wherein X is —O—, —S—, —SO$_2$—, —CO—, —CH$_2$— or >C(CH$_3$)$_2$, and n is 0 or 1, such as 4,4'-diphenylether-bis(N-trimellitimide) unit, (b) 0–30 mol % of a recurring unit or units expressed by formula (3) and/or (4) below:

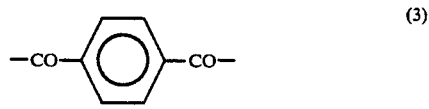

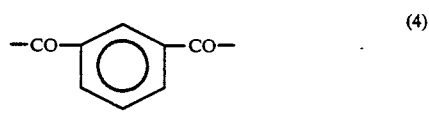

such as terephthalic acid unit, (c) following recurring units of the molar amount corresponding to the sum of above recurring units (a) and (b);

(c1) 3–35 mol % of a recurring unit expressed by formula (5) below

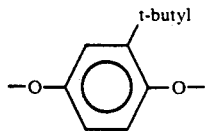

(c2) 2-25 mol % of a recurring unit expressed by formula (6) below

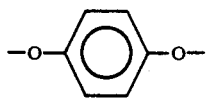

(c3) 0-25 mol % of recurring unit expressed by formula (7) below

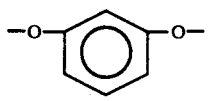

(c4) 2-25 mol % of a recurring unit expressed by formula (8) below

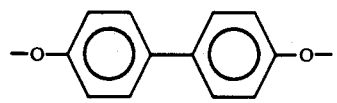

and (d) optionally 5-25 mol % of a recurring unit expressed by formula (9) below

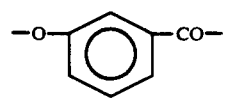

and (e) a recurring unit expressed by formula (10) below

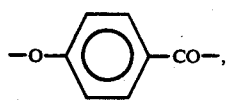

and which is melt-processable at temperatures not higher than 320° C.

Also Japanese Laid-Open (Kokai) Patent Publication No. 132934/1987 discloses wholly aromatic liquid crystal polyesterimides exhibiting similar properties, which do not contain recurring unit (C1), optionally contains a recurring unit expressed by the formula below

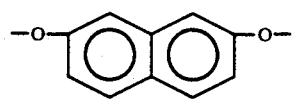

and contains at least 10 mol % of the recurring unit of formula (9).

Both of the above wholly aromatic liquid crystal polyesterimides, however, have a defect of insufficient solder heat resistance.

U.S. Pat. No. 4,067,852 discloses "an improved melt-processable wholly aromatic polyester capable of forming a thermotropic melt-phase at a temperature below approximately 425° C. consisting essentially of the recurring moieties I, II and III wherein I is

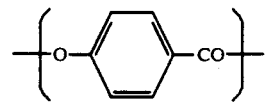

II is

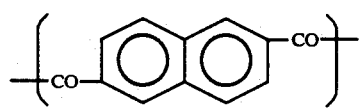

and

III is a symmetrical dioxy aryl moiety of the formula $-\!(\!O\!-\!Ar\!-\!O\!)\!-$ wherein Ar is a divalent radical comprising one or more fused or separate aromatic rings, and wherein said polyester comprises approximately 35 to 80 mol % of moiety I, and wherein each moiety of the polyester is free of ring substitution."

This aromatic polyester shows high melt viscosity and requires melt-processing temperatures exceeding 350° C. Thus an improvement in its melt-processability is desirable.

An object of the present invention is to provide a novel and melt-processable copolyesterimide.

Another object of the present invention is to provide a copolyesterimides exhibiting excellent heat resistance, particularly high solder heat resistance.

Still another object of the present invention is to provide a thermotropic copolyesterimide which has excellent melt-processability and heat resistance, and furthermore excellent mechanical properties.

Other objects and advantages of the present invention will become apparent from the following description.

According to the present invention, the above-stated objects and advantages of the invention are achieved by a melt-processable copolyesterimide which is characterized in that it is composed substantially of:

(A) a structural unit expressed by the formula (I) below,

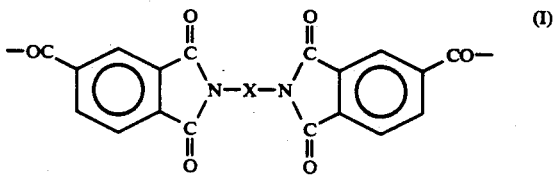

wherein X is selected from the group consisting of

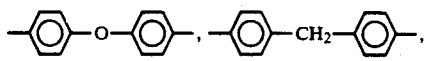

-continued

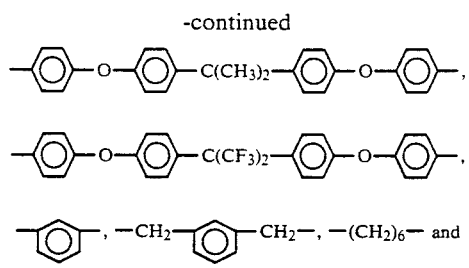

, —CH₂—⌬—CH₂—, —(CH₂)₆— and

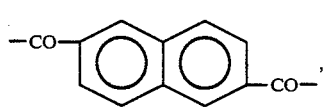

a structural unit expressed by formula (II) below

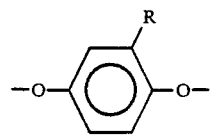 (II)

a structural unit expressed by formula (III) below (III)

-O-⌬(R)-O- wherein R is selected from the group consisting of hydrogen atom, chlorine atom, methyl group and phenyl group, and a structural unit expressed by formula (IV) below

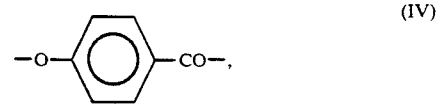 (IV)

(B) the sum of above structural units of formulae (I) and (II) is present in substantially equimolar amount to the structural unit of formula (III), the structural unit of formula (I) occupies 5–20 mol % of the sum of the structural units of formulae (I) and (II), and the structural unit of formula (IV) occupies 15–75 mol % of the sum of structural units of formulae (I), (II), (III) and (IV), and (C) the logarithmic viscosity of the copolyesterimide as measured in pentafluorophenol at a concentration of 0.16 g/dl and at 60° C. is at least 0.8 dl/g.

The structural unit expressed by formula (I) includes the following, in accordance with the definition of X in said formula (I):

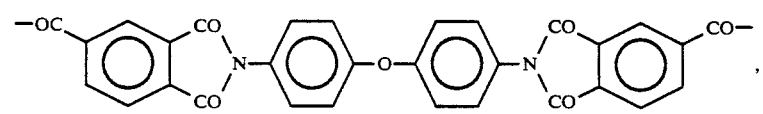 (a).

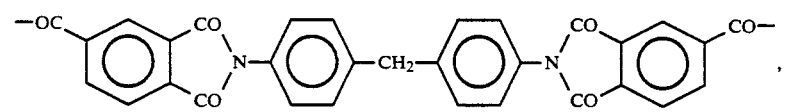 (b).

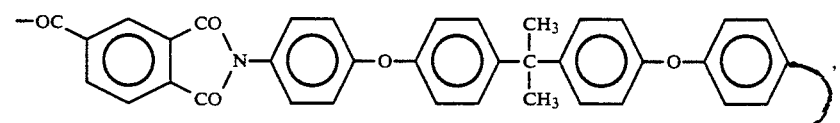 (c).

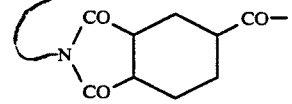

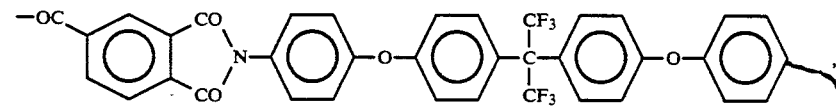 (d).

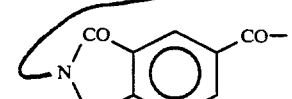

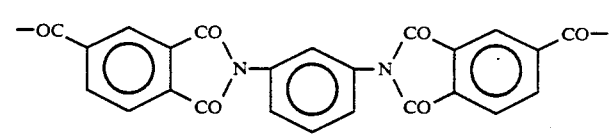 (e).

(f).

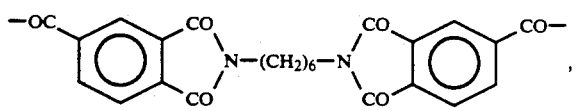

(g).

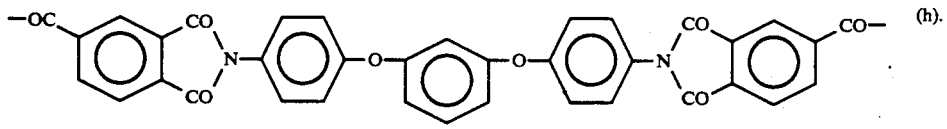

(h).

Of these, preferred structural units (I) are (a), (e) and (f) above.

These structural units (I) are derived from corresponding dicarboxylic acids or derivatives thereof.

The structural unit expressed by formula (II) is self-explanatory, and is derived from 2,6-naphthalenedicarboxylic acid or derivatives thereof.

In formula (III) above, R is hydrogen, chlorine, methyl or phenyl. The structural unit expressed by said formula (III) comprise the following, in accordance with this definition of R:

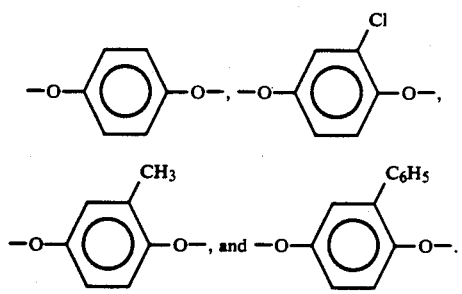

These structural units are derived from corresponding dihydroxy compounds or derivatives thereof.

The preferred structural unit (III) among those is

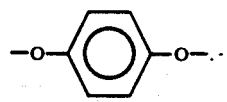

The structural unit expressed by formula (IV) is self-explanatory, and is derived from, p-hydroxybenzoic acid or derivatives thereof.

The copolyesterimide of the present invention is composed substantially of above structural units (I), (II), (III) and (IV). The sum of structural units (I) and (II) are present in substantially equimolar amount to structural unit (III).

The structural unit (I) occupies 5–20 mol % of the sum of structural units (I) and (II). If it is less than 5 mol %, the copolyesterimide exhibits high melt viscosity and impaired melt-processability. Whereas, if the ratio exceeds 20 mol %, the copolyesterimide shows abrupt deterioration in physical properties at the temperature range higher than its glass transition temperature, and comes to have inferior solder heat resistance.

The preferred amount of structural unit (I) is 10–20 mol % on the same basis to the above.

Again the structural unit (IV) occupies 15–75 mol % of the sum of the structural units (I), (II), (III) and (IV). When it is less than 15 mol % or more than 75 mol %, melt-processability of resultant copolyesterimide is impaired and the intended objects of the present invention cannot be accomplished.

The structural unit (IV) preferably occupies 40–70 mol % of said sum of the four units.

The copolyesterimide of the present invention furthermore has a logarithmic viscosity [a value obtained by dividing natural logarithm of a relative viscosity ($\eta$ rel) by concentration C of the measured solution], as measured in pentafluorophenol at a concentration of 0.16 g/dl at 60° C., of at least 0.8 dl/g. When this logarithmic viscosity is less than 0.8 dl/g, the copolyesterimide contains large amounts of low molecular weight oligomers due to its low degree of polymerization, and the strength of resultant molded articles is objectionably low.

Preferred logarithmic viscosity of the copolyesterimide is 1.0–10 dl/g.

The copolyesterimide of the present invention exhibits melt viscosity not higher than 10,000 poise at 350° C., and thus excels in melt-processability. Those having melt viscosity of not higher than 10,000 poise as measured with Koka-type Flow Tester (manufactured by Shimazu Corporation) under the conditions of:

die size = 1 mm$\phi$ × 2 mm and
load = 10 kg, are suitable for injection molding.

The copolyesterimide of the present invention can be prepared in the manner similar to the conventional polycondensation process of polyester.

For instance, it can be prepared by reacting aromatic dicarboxylic acid(s) or ester(s) thereof containing the structural units (I) and (II) as the residues, aromatic dihydroxy compound(s) or ester(s) thereof having the structural unit (III) as the residue, and aromatic hydroxycarboxylic acid(s) or ester(s) thereof containing the structural unit (IV) as the residue.

More specifically, the following methods (1) and (2) may be employed as the typical ones.

(1) A method of subjecting dicarboxylic acids, acetic acid ester of aromatic dihydroxy compound and acetic acid ester of hydroxycarboxylic acid, to polycondensation with deacetylation.

(2) A method of subjecting diphenyl ester of dicarboxylic acids, aromatic dihydroxy compound and phenyl ester of hydroxycarboxylic acid, to polycondensation with dephenolization.

As the aromatic dicarboxylic acids that supply the structural unit (I), the following may be named:
4,4'-diphenylether-bis(N-trimellitimide),
4,4'-diphenylmethane-bis(N-trimellitimide),
1,3-benzene-4-bis(N-trimellitimide),
1,3-xylylene-bis(N-trimellitimide),
[bis(4-diphenylether)-2,2-propane]-bis(N-trimellitimide),
[bis(4-diphenylether)-2,2-hexafluoropropane]-bis(N-trimellitimide),
[bis(4-diphenylether)-1,3-benzene]-bis(N-trimellitimide), and
1,6-hexamethylene-bis(N-trimellitimide).

Such aromatic dicarboxylic acids or their phenyl esters can be used either singly or in combination of two or more.

Those aromatic dicarboxylic acids can be prepared in the following manner. Taking for example 4,4'-diphenylether-bis(N-trimellitimide), for example, 4,4'-diaminodiphenyl ether and trimellitic anhydride are heated in a solvent such as cresol, dimethylformamide or the like to 100°–200° C., for 4–7 hours while removing the formed water from the system, and the resultant product is separated, washed and dried to obtain 4,4'-diphenylether-bis(N-trimellitimide).

Other trimellitimides can be prepared in the similar manner to above, by reacting trimellitic anhydrides with corresponding diamines.

The aromatic dicarboxylic acids that give the structural unit (II) are 2,6-naphthalenedicarboxylic acids. Diphenyl ester of 2,6-naphthalenedicarboxylic acids may also be used.

Aromatic dihydroxy compounds that give the structural unit (III) are 1,4-dihydroxybenzene, 2-chloro-1,4-dihydroxybenzene, 2-methyl-1,4-dihydroxybenzene and 2-phenyl-1,4-dihydroxybenzene. Diacetates of these aromatic dihydroxy compounds (aromatic diacetoxy compounds) are also usable.

Those aromatic dihydroxy compounds or aromatic diacetoxy compounds can be used either singly or in combination of two or more.

Hydroxycarboxylic acids that can give the structural unit (IV) are p-hydroxybenzoic acid or p-acetoxybenzoic acid.

In the above methods (1) and (2), the starting materials as above are used under stoichiometric consideration.

Of the above methods (1) and (2), (1) is the more desirable in that the polycondensation reaction progresses in the absence of a catalyst. In the method (2), metallic compounds such as stannous acetate, tetrabutyltitanate or the like can be used as polycondensation catalyst.

Hereinafter the invention will be more specifically explained with reference to Examples, with the understanding that it should not be limited to the Examples in any sense.

In the Examples, measurements of the properties were conducted by the following methods.

(1) Logarithmic viscosity

The test sample such as the copolyesterimide was dissolved in pentafluorophenol so that it had a concentration of 0.16 g/dl and its logarithmic viscosity [(ln$\eta$rel)/c] was measured with Cannon-Minning Semi-micro Viscometer at a temperature of 60° C.

(2) Starting temperature of thermal decomposition and 5% weight-loss temperature The Starting temperature of thermal decomposition and 5% weight-loss temperature were measured with a thermogravimetric device made by Seiko Electronics (model: TG/DTA200) using 4 mg of a sample, under circulation of dry air (flow rate: 300 ml/min.) at a temperature elevation rate of 10° C./min.

(3) Glass transition temperature and Tm

Glass transition temperature of the polymer and the temperature (Tm) at which endotherm due to melting is observed were measured with 15 mg of each sample in a non-closed aluminum container, using a differential scanning calorimeter (DSC, model: SSC/560 S, manufactured by Seiko Electronics) in nitrogen gas current (flow rate: 30 ml/min.) and at the temperature elevation rate of 20° C./min., starting from 30° C.

(4) Optical anisotropy

Whether or not a polymer had optical anisotropy was observed by using a polarizing microscope Optiphoto-POL (manufactured by Nikon) equipped with a hot stage (manufactured by Melter).

(5) Melt viscosity

Apparent melt viscosity was measured using a flow tester manufactured by Shimazu Corporation (model: CFT-500; die: 1 mm$\phi \times$2 mm; load: 10 kg).

(6) Solder heat resistance

Solder heat resistance was measured by dipping each sample strand of 2 mm in diameter obtained with the use of a flow tester of Shimazu Corporation (model: CFT-500; die 2 mm$\phi \times$10 mm; load: 10 kg) in a solder bath of 260° C. or 280° C. and measuring the time passed before changes such as blistering or deformation became observable in the sample.

EXAMPLE 1

A 50-ml reactor equipped with a stirrer, thermometer, pressure gauge, nitrogen gas-introducing pipe and a distillation head connected to a condenser was charged with 10.81 g (0.06 mol) of p-acetoxybenzoic acid, 3.88 g (0.02 mol) of 1,4-diacetoxybenzene, 1.10 g (0.002 mol) of 4,4'-diphenylether-bis(N-trimellitimide) and 3.89 g (0.018 mol) of 2,6-naphthalenedicarboxylic acid. The atmosphere inside the reactor was purged three times with nitrogen, and then the temperature therein was raised to 200° C. with mild stirring and while passing a small amount of nitrogen gas therethrough.

After 200° C. was reached, stirring speed was increased and the temperature of the mixture was raised stepwisely. Thus the system was allowed to react for one hour at 240° C., another one hour at 260° C., further one hour at 280° C., and subsequently for two hours at 300° C.

The amount of acetic acid distilled during the reaction was 4.8 g.

Then the pressure inside the reactor was gradually reduced, and while vacuum of 0.5 Torr was maintained, the system was stirred for one hour at 300° C., 30 minutes at 320° C., and another 30 minutes at 340° C. to complete the polymerization.

The results of evaluating physical properties of the resultant polymer are shown collectively in Table 1. This polymer exhibited optical anisotrpopy in molten state.

EXAMPLE 2

A reactor similar to the one used in Example 1 was charged with 10.81 g (0.06 mol) of p-acetoxybenzoic acid, 3.88 g (0.02 mol) of 1,4-diacetoxybenzene, 1.92 g (0.0035 mol) of 4,4-diphenyletherbis(N-trimellitimide) and 3.57 g (0.0165 mol) of 2,6-naphthalenedicarboxylic acid, and a polymer was synthesized in the manner similar to Example 1, except that the reaction temperatures and time under the vacuum of 0.5 Torr were changed to one hour at 300° C., 30 minutes at 310° C., and another 30 minutes at 320° C.

The results of evaluating physical properties of resultant polymer are shown collectively in Table 1. This polymer exhibited optical anisotropy in molten state.

EXAMPLE 3

A reactor similar to the one used in Example 1 was charged with 10.81 g (0.06 mol) of p-acetoxybenzoic acid, 3.88 g (0.02 mol) of 1,4-diacetoxybenzene, 0.92 g (0.002 mol) of 1,3-benzene-bis(N-trimellitimide) and 3.89 g (0.018 mol) of 2,6-naphthalenedicarboxylic acid, and a polymer was synthesized in the manner similar to Example 1, except that the reaction temperatures and time under the vacuum of 0.5 Torr were changed to one hour at 300° C. and another 1.5 hours at 310° C.

The results of evaluating physical properties of resultant polymer are shown collectively in Table 1. This polymer exhibited optical anisotropy in molten state.

EXAMPLE 4

A reactor similar to the one used in Example 1 was charged with 10.81 g (0.06 mol) of p-acetoxybenzoic acid, 3.88 g (0.02 mol) of 1,4-diacetoxybenzene, 0.98 g (0.002 mol) of 1,3-xylylene-bis(N-trimellitimide) and 3.89 g (0.018 mol) of 2,6-naphthalenedicarboxylic acid, and a polymer was synthesized in the manner similar to Example 1, except that the reaction temperatures and time under the vacuum of 0.5 Torr were changed to one hour at 300° C. and another one hour at 310° C.

The results of evaluating physical properties of resultant polymer are shown collectively in Table 1. This polymer exhibited optical anisotropy in molten state.

TABLE 1

| Example No. | | 1 | 2 | 3 | 4 |
|---|---|---|---|---|---|
| Materials | DDE-DIDC | 2 | 3.5 | — | — |
| formulation | m-PDA-DIDC | — | — | 2 | — |
| (mol %) | MXDA-DIDC | — | — | — | 2 |
| | NDCA | 18 | 16.5 | 18 | 18 |
| | HQ-DA | 20 | 20 | 20 | 20 |
| | ABA | 60 | 60 | 60 | 60 |
| Logarithmic viscosity (dl/g) | | 3.99 | 3.98 | 1.95 | 2.02 |
| Glass transition temp. (°C.) | | —* | 110 | 101 | 92 |
| Tm (°C.) | | 319 | 306 | 305 | 300 |
| Starting temperature of thermal decomposition (°C.) | | 475 | 474 | 470 | 460 |
| 5% Weight decrease temp. (°C.) | | 459 | 452 | 438 | 427 |
| Melt viscosity (poise) | | 4000 | 1500 | 5000 | 1200 |
| Measuring temp. (°C.) | | 320 | 315 | 305 | 310 |
| Solder heat resistance (sec.) | | | | | |
| Measuring temp. 260° C. | | >60 | >60 | >60 | >60 |
| Measuring temp. 280° C. | | >60 | >60 | >60 | >60 |

*undetectable

Abbreviations used for the starting materials:
DDE-DIDC: 4,4'-diphenylether-bis(N-trimellitimide)
m-PDA-DIDC: 1,3-benzene-bis(N-trimellitimide)
MXDA-DIDC: 1,3-xylylene-bis(N-trimellitimide)
NDCA: 2,6-naphthalenedicarboxylic acid
HQ-DA: 1,4-diacetoxybenzene
ABA: p-acetoxybenzoic acid

EXAMPLE 5

A reactor similar to the one used in Example 1 was charged with 10.81 g (0.06 mol) of p-acetoxybenzoic acid, 1.94 g (0.01 mol) of 1,4-diacetoxybenzene, 2.08 g (0.01 mol) of 2-methyl-1,4-diacetoxybenzene, 1.10 g (0.002 mol) of 4,4'-diphenylether-bis(N-trimillitimide) and 3.89 g (0.018 mol) of 2,6-naphthalenedicarboxylic acid, and a polymer was synthesized through the procedures similar to those of Example 1, except that the reaction temperatures and time under the vacuum of 0.5 Torr were changed to 1.5 hours at 300° C. and 2 hours at 310° C.

The results of evaluating physical properties of resultant polymer are shown collectively in Table 2. This polymer exhibited optical anisotropy in molten state.

EXAMPLE 6

A reactor similar to the one used in Example 1 was charged with 10.81 g (0.06 mol) of p-acetoxybenzoic acid, 3.88 g (0.02 mol) of 1,4-diacetoxybenzene, 1.92 g (0.002 mol) of 4,4-diphenylmethane-bis(N-trimellitimide) and 3.89 g (0.018 mol) of 2,6-naphthalenedicarboxylic acid, and a polymer was synthesized through the procedures similar to those of Example 1, except that the reaction temperatures and time under the vacuum of 0.5 Torr were changed to one hour at 310° C. and 1.5 hours at 320° C.

The results of evaluating physical properties of resultant polymer are shown collectively in Table 2. This polymer exhibited optical anisotropy in molten state.

TABLE 2

| Example No. | | 5 | 6 |
|---|---|---|---|
| Materials | DDE-DIDC | 2 | — |
| formulation | DDM-DIDC | — | 2 |
| (mol %) | NDCA | 18 | 18 |
| | Me-HQ-DA | 10 | — |
| | HQ-DA | 10 | 20 |
| | ABA | 60 | 60 |
| Logarithmic viscosity (dl/g) | | 2.85 | 3.25 |
| Glass transition temp. (°C.) | | 99 | 104 |
| Tm (°C.) | | 295 | 310 |
| Starting temperature of thermal decomposition (°C.) | | 454 | 462 |
| 5% Weight decrease temp. (°C.) | | 436 | 426 |
| Melt viscosity (poise) | | 3800 | 4000 |
| Measuring temp. (°C.) | | 295 | 315 |
| Solder heat resistance (sec.) | | | |
| Measuring temp. 260° C. | | >60 | >60 |
| Measuring temp. 280° C. | | >60 | >60 |

Abbreviations used for the starting materials:
DDE-DIDC: 4,4'-diphenylether-bis(N-trimellitimide)
DDM-DIDC: 4,4'-diphenylmethane-bis(N-trimellitimide)
NDCA: 2,6-naphthalenedicarboxylic acid
Me-HQ-DA: 2-methyl-1,4-diacetoxybenzene
HQ-DA: 1,4-diacetoxybenzene ABA: p-acetoxybenzoic acid

COMPARATIVE EXAMPLE 1

A reactor similar to the one used in Example 1 was charged with 10.81 g (0.06 mol) of p-acetoxybenzoic acid, 3.88 g (0.02 mol) of 1,4-diacetoxybenzene, 5.49 g (0.01 mol) of 4,4'-diphenylether-bis(N-trimellitimide) and 2.16 g (0.01 mol) of 2,6-naphthalenedicarboxylic acid, and a polymer was synthesized through the procedures similar to those of Example 1, except that the reaction temperatures and time under the vacuum of 0.5 Torr were changed to 1.5 hours at 300° C. and 1.5 hours at 310° C.

The results of evaluating physical properties of resultant polymer are shown collectively in Table 3. This polymer exhibited optical anisotropy in molten state.

From Tables 1–3, it can be understood that the polymer obtained in this comparative example was inferior in solder heat resistance compared to the polymers obtained in Examples 1–6.

COMPARATIVE EXAMPLE 2

A reactor similar to the one used in Example 1 was charged with 10.81 g (0.06 mol) of p-acetoxybenzoic acid, 3.88 g (0.02 mol) of 1,4-diacetoxybenzene, 2.74 g (0.005 mol) of 4,4'-diphenylether-bis(N-trimellitimide) and 3.24 g (0.015 mol) of 2,6-naphthalenedicarboxylic acid, and a polymer was synthesized through the procedures similar to those of Example 1, except that the reaction temperature and time under the vacuum of 0.5 Torr were changed to 1.5 hours at 300° C.

The results of evaluating physical properties of resultant polymer are shown collectively in Table 3. This polymer exhibited optical anisotropy in molten state.

From Tables 1–3, it can be understood that the polymer obtained in this comparative example was inferior in solder heat resistance compared to the polymers obtained in Examples 1–6.

COMPARATIVE EXAMPLE 3

A reactor similar to the one used in Example 1 was charged with 7.20 g (0.04 mol) of p-acetoxybenzoic acid, 5.82 g (0.03 mol) of 1,4-diacetoxybenzene and 16.46 g (0.03 mol) of 4,4'-diphenylether-bis(N-trimellitimide), and a polymer was synthesized through the procedures similar to those of Example 1, except that the reaction temperatures and time under the vacuum of 0.5 Torr were changed to one hour at 300° C., 30 minutes at 320° C. and another 30 minutes at 340° C.

The results of evaluating physical properties of resultant polymer are shown collectively in Table 3. This polymer exhibited optical anisotropy in molten state.

This comparative example is based on a working Example of Japanese Laid-Open (Kokai) Patent Publication No. 132934/1987. It can be understood from Tables 1–3 that the product of this comparative example was inferior in solder heat resistance compared to the polymers obtained in Examples 1–6.

COMPARATIVE EXAMPLE 4

A reactor similar to the one used in Example 1 was charged with 10.81 g (0.06 mol) of p-acetoxybenzoic acid, 3.88 g (0.02 mol) of 1,4-diacetoxybenzene and 4.32 g (0.02 mol) of 2,6-naphthalenedicarboxylic acid, and a polymer was synthesized through the procedures similar to those of Example 1, except that the reaction temperatures and time under the vacuum of 0.5 Torr were changed to one hour at 320° C. and another one hour at 340° C.

The results of evaluating physical properties of resultant polymer are shown collectively in Table 3. This polymer exhibited optical anisotropy in molten state.

This comparative example is based on a working Example of U.S. Pat. No. 4,067,852. The product polymer exhibited high melt viscosity and required melt-processing temperatures above 350° C.

TABLE 3

| Comparative Example No. | | 1 | 2 | 3 | 4 |
|---|---|---|---|---|---|
| Materials | DDE-DIDC | 10 | 5 | 30 | — |
| formulation | NDCA | 10 | 15 | — | 20 |
| (mol %) | HQ-DA | 20 | 20 | 30 | 20 |
| | ABA | 60 | 60 | 40 | 60 |
| Logarithmic viscosity (dl/g) | | 2.77 | 1.34 | 1.54 | 5.42 |
| Glass transition temp. (°C.) | | 127 | 109 | 158 | —* |
| Tm (°C.) | | 267 | 281 | 313 | 333 |
| Melt viscosity (poise) | | 4000 | 7000 | 4000 | 10000 |
| Measuring temp. (°C.) | | 265 | 280 | 315 | 350 |
| Solder heat resistance (sec.) | | | | | |
| Measuring temp. 260° C. | | 10 | >60 | >60 | >60 |
| Measuring temp. 280° C. | | 5 | 10 | 10 | >60 |

*undetectable

Abbreviations used for the starting materials:
DDE-DIDC: 4,4'-diphenylether-bis(N-trimellitimide)
NDCA: 2,6-naphthalenedicarboxylic acid
HQ-DA: 1,4-diacetoxybenzene
ABA: p-acetoxybenzoic acid

What we claim is:

1. A melt-processable copolyesterimide composed substantially of:

(A) a structural unit expressed by the formula (I) below, $$-OC-\underset{\underset{O}{\overset{\overset{O}{\|}}{C}}}{\underset{\underset{\|}{C}}{\overset{}{\bigcirc}}}\!\!\!\!\!N-X-N\!\!\!\!\!\underset{\underset{\|}{C}}{\overset{\overset{\|}{C}}{\bigcirc}}-CO- \quad (I)$$

wherein X is selected from the group consisting of

—⬡—O—⬡—,

—⬡—CH$_2$—⬡—,

—⬡—, and

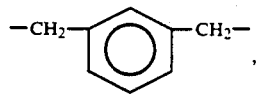

a structural unit expressed by formula (II) below

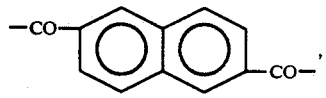

a structural unit expressed by formula (III) below

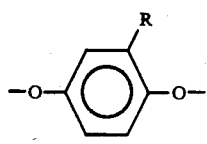

wherein R is selected from the group consisting of hydrogen atom, chlorine atom, methyl group and phenyl group, and a structural unit expressed by formula (IV) below

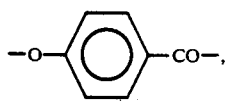

(B) the sum of above structural units of formulae (I) and (II) is present in substantially equimolar amount to the structural unit of formula (III), the structural unit of formula (I) comprises 5-20 mol % of the sum of the structural units of formulae (I) and (II), and the structural unit of formula (IV) comprises 15-75 mol % of the sum of structural units of formulae (I), (II), (III) and (IV), and (C) the logarithmic viscosity of the copolyesterimide as measured in pentafluorophenol at a concentration of 0.16 g/dl and at 60° C. is at least 0.8 dl/g.

2. A copolyesterimide of claim 1, in which X in formula (I) is

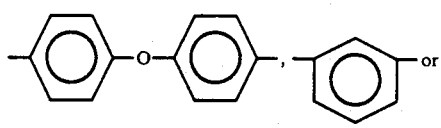

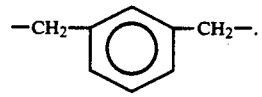

3. A copolyesterimide of claim 1, in which R in formula (III) is hydrogen atom.

4. A copolyesterimide of claim 1, in which the structural unit of formula (I) comprises 10-20 mol % of the sum of the structural units of above formulae (I) and (II).

5. A copolyesterimide of claim 1, in which the structural unit of formula (IV) comprises 40-70 mol % of the sum of the structural units of above formulae (I), (II), (III) and (VI).

6. A copolyesterimide of claim 1 of which logarithmic viscosity is within a range of 1.0-10 dl/g.

7. A copolyesterimide of claim 1 in which X in formula (I) is

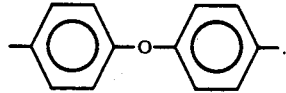

8. A copolyesterimide of claim 1, said copolyesterimide having a solder heat resistance at 260° C. of greater than 60 seconds.

* * * * *